United States Patent [19]
Collyer

[11] Patent Number: 5,915,208
[45] Date of Patent: Jun. 22, 1999

[54] VEHICULAR REPEATER SYSTEM AND METHOD THEREFOR

[75] Inventor: Ronald Scott Collyer, Sunrise, Fla.

[73] Assignee: Motorola, Inc., Schaumburg, Ill.

[21] Appl. No.: 08/725,280

[22] Filed: Oct. 2, 1996

[51] Int. Cl.$^6$ .................................................. H04B 7/15
[52] U.S. Cl. .............................. 455/11.1; 455/8; 455/527
[58] Field of Search ............................. 455/404, 9, 11.1, 455/10, 8, 7, 18, 521, 527, 15, 517, 572

[56] References Cited

U.S. PATENT DOCUMENTS

| | | |
|---|---|---|
| 4,056,779 | 11/1977 | Toler . |
| 4,056,780 | 11/1977 | Faulkner . |
| 4,539,706 | 9/1985 | Mears et al. . |
| 5,056,152 | 10/1991 | Truby et al. . |
| 5,109,526 | 4/1992 | Reed . |
| 5,239,666 | 8/1993 | Truby . |
| 5,448,766 | 9/1995 | Sanning et al. .............................. 455/9 |

OTHER PUBLICATIONS

Beaman, W. "Vehicular Mounted Repeater in Emergency Medical Services (EMS) Communications"; IEEE Transactions on Vehicular Technology vol. VT–28, No. 4, Nov. 1979.

Motorola Systems 9000 Vehicular Repeater System Instruction Manual 68PO7993D61–0, pp. iii–16, 1993.

*Primary Examiner*—Nguyen Vo
*Attorney, Agent, or Firm*—Andrew S. Fuller

[57] ABSTRACT

In a communication environment (140) having multiple vehicular repeater systems (110, 120) operating according to a priority scheme designating primary responsibility for retransmitting signals, a vehicular repeater system (120) supports automatic transitioning from a non-priority mode to a priority mode (410, 420). The vehicular repeater system (120), when operating in a non-priority mode, detects that a communication signal was submitted for retransmission by a priority vehicular repeater system (440), and monitors for a particular time period to detect an acknowledgment signal (450). When no acknowledgment signal is detected within the particular period, the priority scheme is modified, preferably such that the non-priority vehicular repeater assumes priority repeater status (460). In another aspect of the invention, the non-priority vehicular repeater system detects when the priority vehicular repeater system is unavailable, non-functional, or operating in a reduced functionality mode, and as a result assumes priority status (610, 620, 630).

22 Claims, 6 Drawing Sheets

VEHICULAR REPEATER SYSTEM AND METHOD THEREFOR

TECHNICAL FIELD

This invention relates in general to radio communication systems, and more particularly, to radio systems employing vehicular repeaters with an automatic transmission priority scheme.

BACKGROUND

Vehicular repeater systems allow high power mobile radio units to be used in extending the communication range of portable radio communication units. In operation, a vehicular repeater receives communication signals from a portable radio and retransmits these signals at a higher power to enable extended range communication. Preferably, such range extension is automated such that when a portable radio is within communication range of a vehicular repeater this range extension takes place. A problem of interference may develop when multiple vehicular repeaters within communication range of the portable radio attempt to retransmit the communication signal. The prior art addresses this problem by providing a management scheme that designates one of the vehicular repeaters to be a priority repeater, which priority repeater has primary responsibility for repeating signals of any portable radio within communication range. One such priority scheme is described in U.S. Pat. No. 4,056,779 issued to Toler on Apr. 5, 1976 for a Vehicular Repeater. In this implementation, each vehicular repeater entering a particular communication environment determines whether or not to assume priority repeater status by monitoring for repeater communication. If none is detected, the vehicular repeater assumes priority repeater status and transmits a communication signal to update the status of any other vehicular repeater operating in that environment. Thus, only one vehicular repeater operates as a priority repeater in the particular communication environment.

In a typical prior art implementation, a priority vehicular repeater system receives transmission from a portable radio on a particular channel and retransmits the signal using a high power mobile radio on another communication channel. Non-priority vehicular repeaters monitor both communication signals to determine whether signals transmitted by the portable radio are being properly re-transmitted by the mobile radio at the priority repeater. If it is determined that transmissions from the portable radio are not being retransmitted, each non-priority repeater monitoring the situation updates its delay counter until one of the non-priority repeater has a delay state of zero, and therefore assumes priority repeater status. Thus, the designation of one of the vehicular repeater as a priority repeater is automatically maintained.

A problem arises when a short burst communication signal, such as an emergency alarm, is transmitted by the portable radio but not retransmitted by the priority vehicular repeater. Under the prior art prioritization scheme based on delay states, a non-priority vehicular repeater will assume priority status after a particular time lapse without retransmission from the priority repeater. However, retransmission of the signals from the portable radio will not occur until after this time lapse. Thus, the emergency alarm or other short data burst signal could be transmitted by the portable unit but not retransmitted by any vehicular repeater because the original priority repeater was unavailable. This break down of protocol occurs despite the detection of the communication signal containing the emergency alarm by non-priority vehicular repeaters.

While the use of delay states offers a straight forward implementation and works in a substantial number of operating environments, the inability to support the repeating of short burst communication signals, such as emergency alarm signals, when a priority repeater is no longer available is a problem in the art. It is desirable to take advantage of the benefits offered by a vehicular repeater system with automatic transmission priority scheme, while providing support for such short burst communication signals. Therefore, an improved vehicular repeater system with automatic priority assignment is needed.

DETAILED DESCRIPTION OF THE PREFERRED EMBODIMENT

The present invention provides for a vehicular repeater system that supports automatic transitioning from a non-priority mode to a priority mode. The vehicular repeaters operate in a common communication environment according to a particular priority scheme that designates a priority vehicular repeater and at least one non-priority vehicular repeater. In normal operation, the priority repeater transmits an acknowledgment to a communication signal, such as a emergency communication received for retransmission. A non-priority vehicular repeater detects that this communication signal was submitted for retransmission by the priority vehicular repeater, and monitors for a particular duration to detect the acknowledgment. When no acknowledgment is detected within the particular duration, the particular priority scheme is modified, preferably such that the non-priority vehicular repeater assumes priority repeater status. Thus, when the priority vehicular repeater is unavailable, non-functional, or operating in a reduced functionality mode, priority repeater status can be assumed more quickly by a non-priority vehicular repeater. This is particularly useful in emergency alarm situations.

Figure 1:
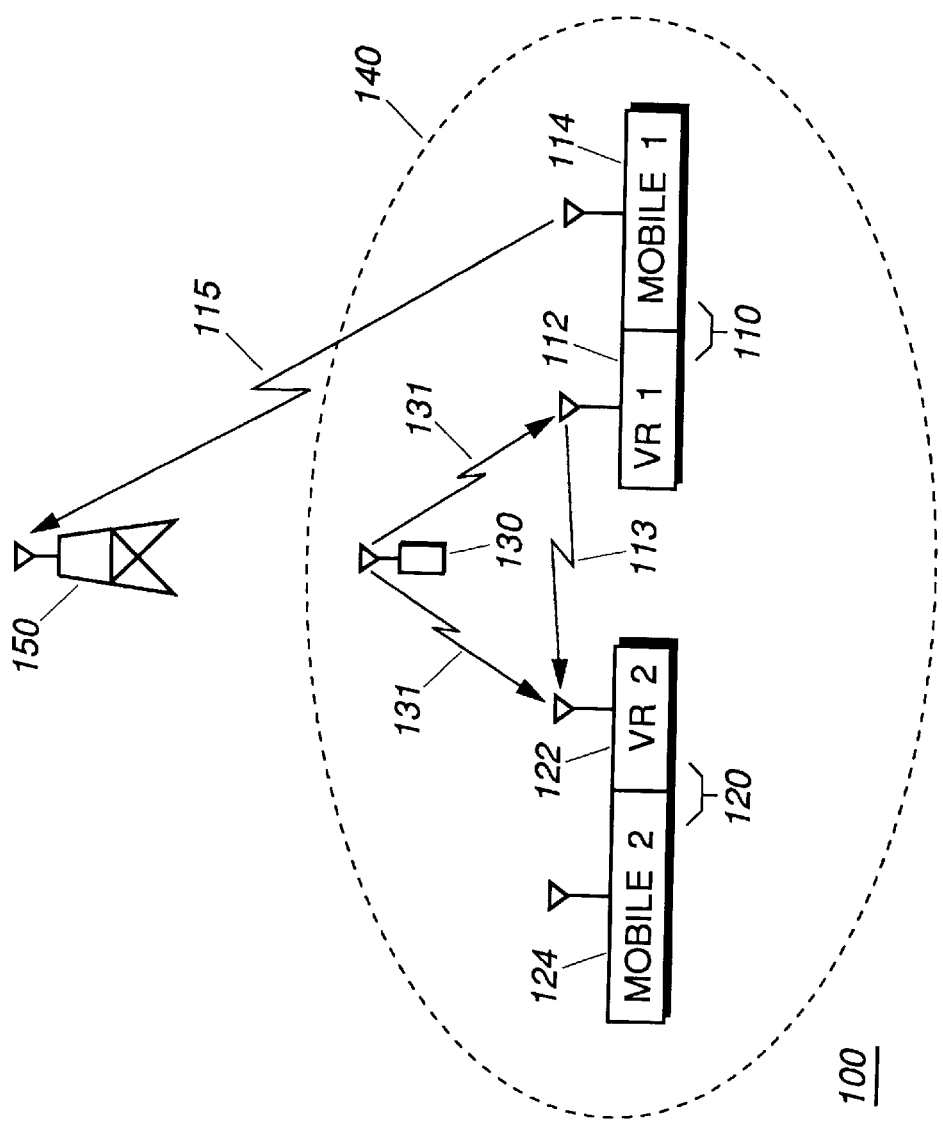
FIG. 1 is a diagram of a radio communication system employing vehicular repeaters according to a particular priority scheme, in accordance with the present invention.

FIG. 1 is a diagram of a radio communication system 100, in accordance with the present invention. The communication system 100 includes a portable communication device 130, multiple vehicular repeater systems 110, 120, and a base station 150. The communication device 130 is a portable two-way radio capable of operating on one or more radio frequency communication channels. The portable radio 130 operates in a communication environment 140 and is within communication range of the vehicular repeater systems 110, 120. The vehicular repeaters systems 110, 120 operate according to a priority scheme that designates vehicular repeater system 110 as a priority vehicular repeater and vehicular repeater system 120 as a non-priority vehicular repeater. Although only one non-priority system is shown, there may be many operating in a particular communication environment. In the preferred embodiment, the priority scheme is base in part on a delay state and counter system in which the priority repeater ordinarily operates with a delay state of zero, and a non-priority repeater operates with a delay state of one or more time periods. A delay state of zero indicates that the vehicular repeater should retransmit any signal submitted for retransmission without any delay. A non-zero delay state signifies that the vehicular repeater is in a non-priority mode and will monitor for communication activity indicating that the priority repeater is still active. When no communication activity is detected within the delay period, a non-priority repeater will reduce its delay state which in effect will adjust its priority. The principles of one such delay state based priority scheme are taught in U.S. Pat. No. 4,056,779, issued to Toler on Apr. 5, 1976, for a Vehicular Repeater, the entire contents of which are hereby incorporated by reference.

In operation, the portable radio 130 transmits a communication signal 131 which is received by the priority vehicular repeater system 110, and retransmitted to the base station 150 via signal path 115. According to the present invention, when the portable radio 130 transmits a short burst communication signal, such as an emergency alarm, the priority repeater system 110 transmits an acknowledgment 113 to indicate receipt and/or processing of the short burst communication signal. The alarm acknowledgment is communicated according a protocol that governs handshaking among vehicular repeaters. In the preferred embodiment, the acknowledgment signal is a distinct tone signal of a particular frequency for a particular duration. The non-priority vehicular repeater system 120 takes advantage of the presence or absence of this acknowledgment signal in determining when to modify the priority scheme, such as to assume priority status.

Figure 2:
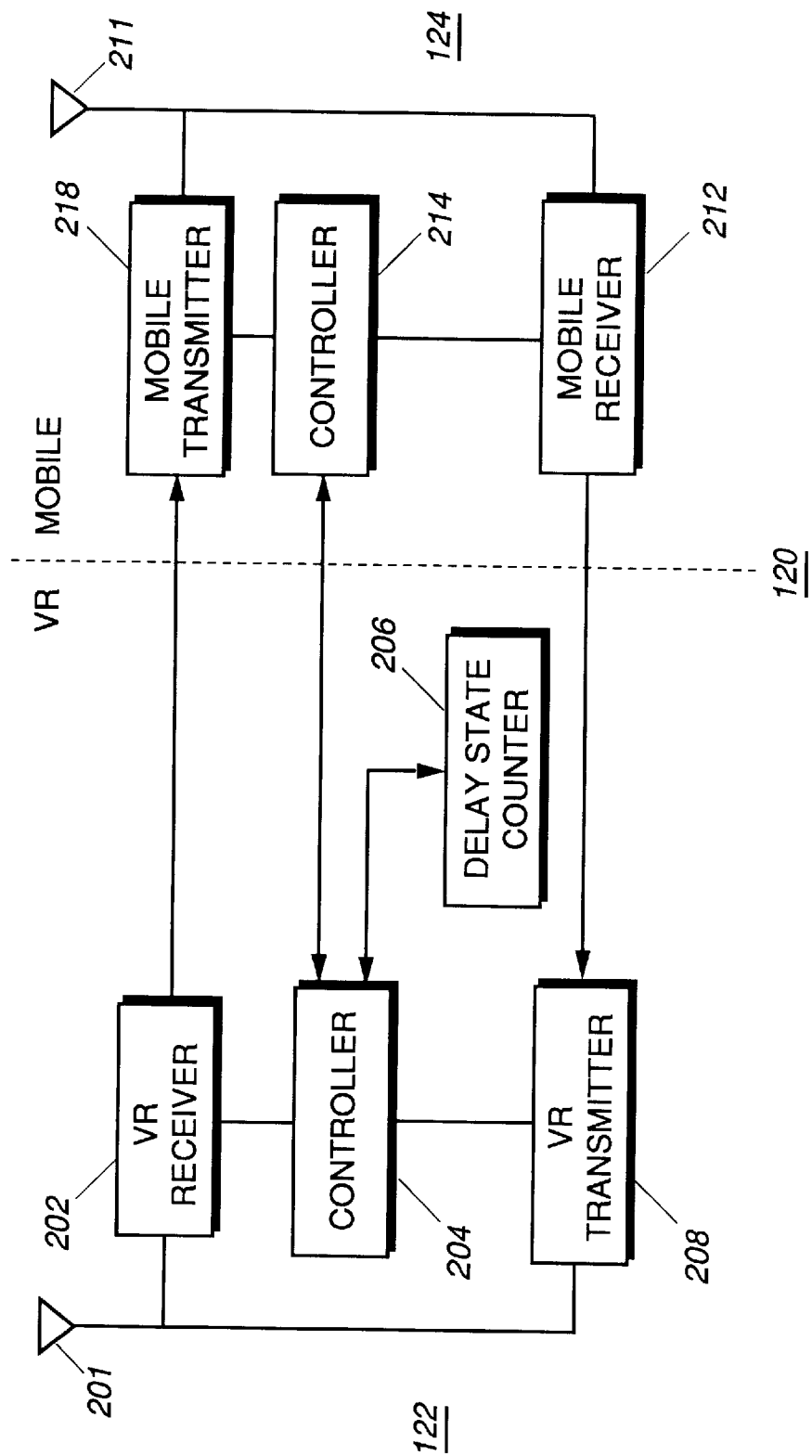
FIG. 2 is a block diagram of a vehicular repeater system, in accordance with the present invention.

FIG. 2 is a block diagram highlighting important functional blocks of the non-priority vehicular repeater system 120. The other vehicular repeater system 110 is similarly constructed. The vehicular repeater system 120 includes a vehicular repeater portion 122, and a mobile radio 124. The vehicular repeater portion 122 includes a receiver 202, a transmitter 208, a controller 204, and delay state counter 206. The receiver 202 operates under control of the controller 204 to receive signals for retransmission via an antenna 201. The transmitter 208 operates in conjunction with the controller to transmit signals intended for the portable receivers via the antenna 201. The delay state counter 206 operates to determine the priority status of the vehicular repeater system 120. When the delay state counter represents a delay state of zero, the vehicular repeater system 120 has priority repeater status. When the delay state counter represents a non-zero delay state, the vehicular repeater system is in non-priority mode. The vehicular repeater 122 interfaces with the mobile radio 124 to support its retransmission functions. Thus, the vehicular repeater receiver 202 is coupled to a mobile transmitter 218, and the vehicular repeater transmitter 208 is coupled to a mobile receiver 212. The mobile transmitter 218 and the mobile receiver 212 are coupled to a mobile antenna 211. The mobile radio 124 has a controller 214 that controls the operation of the mobile transmitter 218 and mobile receiver 212. Communication between the controller 204 for the vehicular repeater 122 and the controller 214 for mobile radio 124 facilitates operation of the vehicular repeater system 120.

Figure 3:
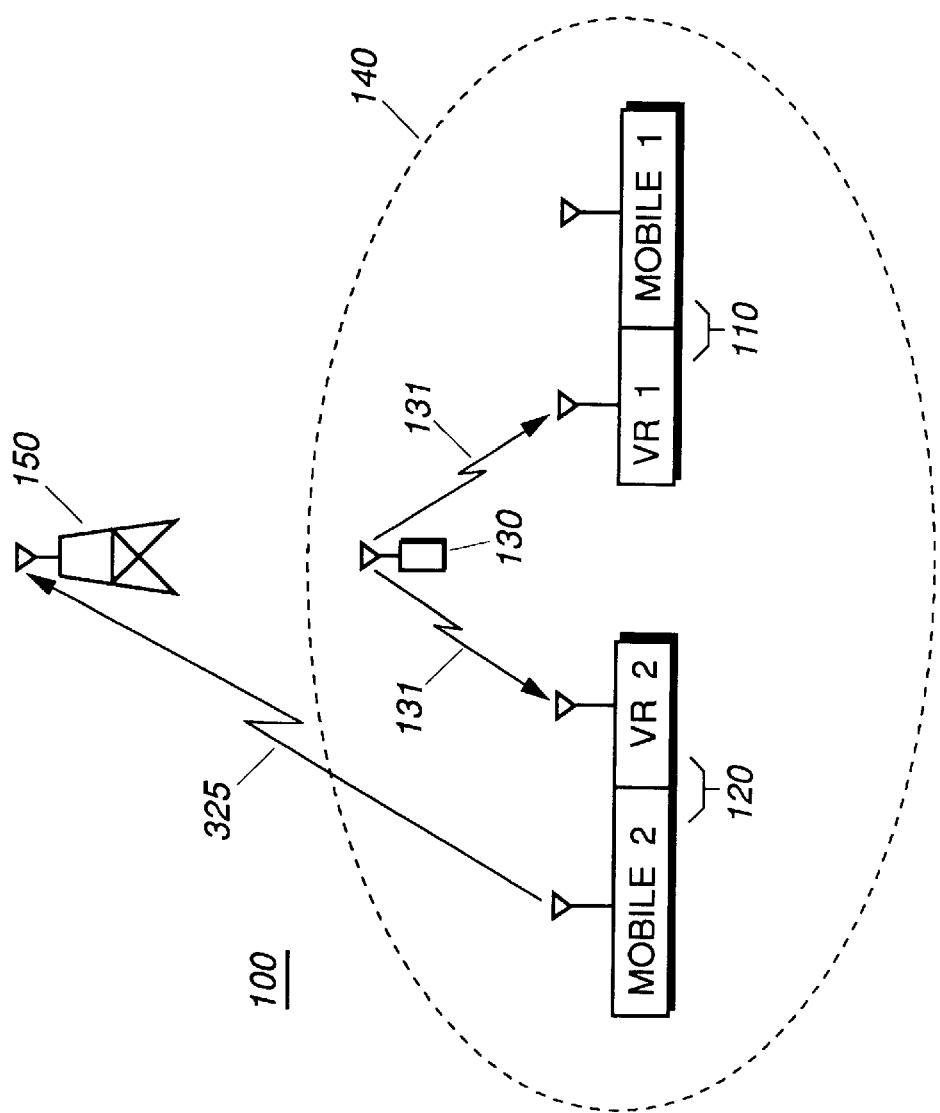
FIG. 3 shows the communication system of FIG. 1 with a modified prioritization scheme, in accordance with the present invention.

According to the present invention, the non-priority vehicular repeater system 120 monitors to detect an acknowledgment signal when a short burst communication signal is submitted to the priority vehicular repeater system for retransmission. If the acknowledgment signal is not detected within a predetermined period of time, the non-priority vehicular repeater system 120 assumes priority status thereby modifying the priority scheme governing automatic retransmissions. FIG. 3 depicts the transitioning of priority repeater status from the priority vehicular repeater system 110 to the non-priority vehicular repeater system 120, when an emergency alarm transmitted by the portable radio 130 is not acknowledged by the priority vehicular repeater system 110. Upon the absence of an acknowledgment signal from the priority vehicular repeater system 110 within a predetermined period of time, the non-priority vehicular repeater system 120 assumes priority status. In the preferred embodiment, this is accomplished by updating the delay state counter such that the non-priority vehicular repeater system 120 has a delay state of zero. Once priority status is assumed, the previously non-priority vehicular repeater system 120 retransmits the emergency alarm and other received signals 131 via signal path 325 to the base station 150.

Figure 4:
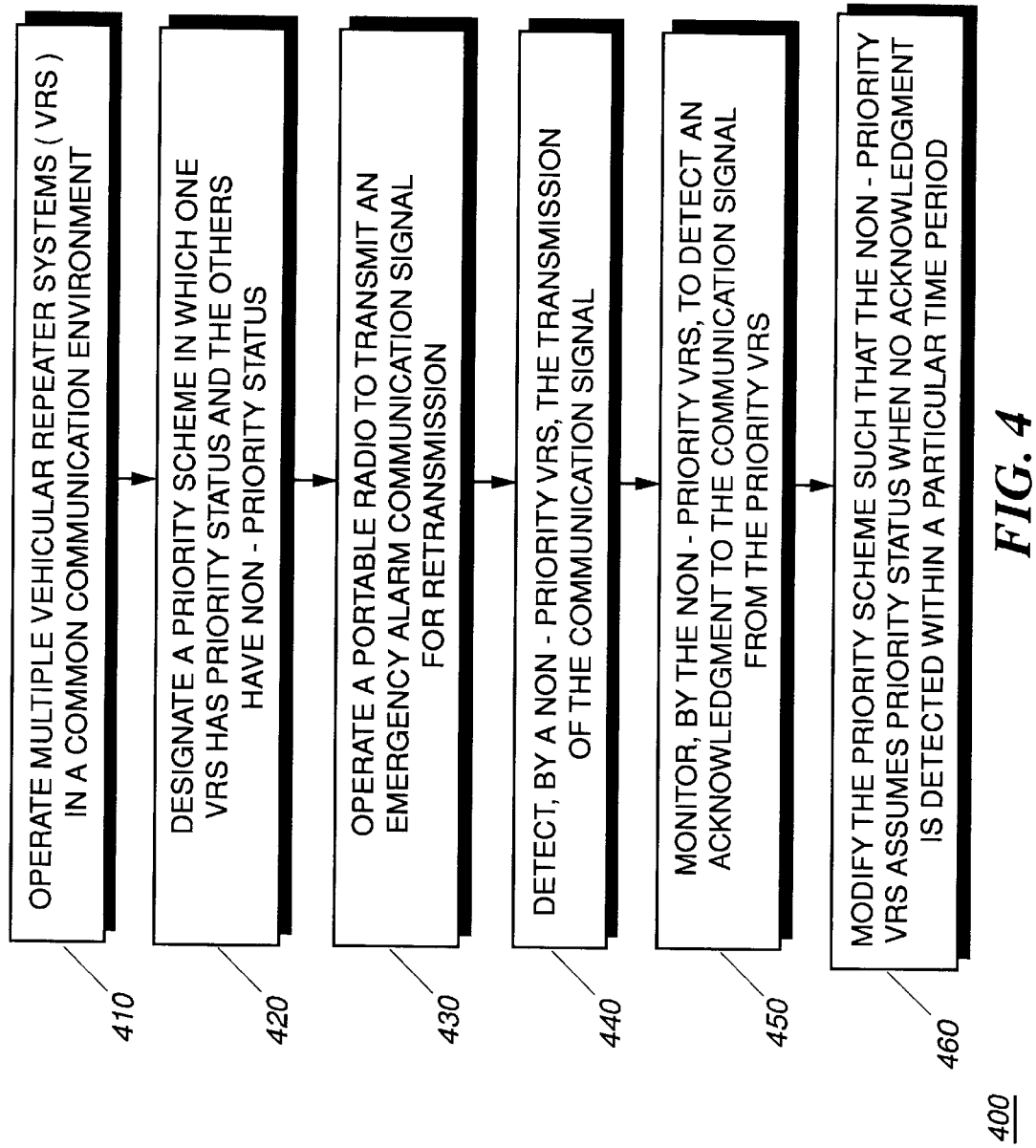
FIG. 4 is a flowchart of procedures for automatic modification of a priority scheme for a vehicular repeater system, in accordance with the present invention.

FIG. 4 is a flowchart of procedures 400 summarizing the transitioning of priority status in accordance with the present invention. Multiple vehicular repeater systems are operated within a communication environment within a range of a portable radio communication device, step 410. The vehicular repeater systems have a designated priority scheme in which one vehicular repeater system has priority repeater status that signifies primary responsibility for repeating communications from the communication device, and other vehicular repeater systems have non-priority status, but are selectively adaptable to function with priority status, step 420. The portable radio is operated to transmit an emergency alarm communication signal for retransmission by the priority repeater, step 430. A non-priority vehicular repeater system detects the transmission of the communication signal, step 440, and monitors to detect an acknowledgment to the communication signal from the priority vehicular repeater system, step 450. The priority scheme is modified such that the non-priority vehicular repeater system assumes priority status when no acknowledgment is detected within the particular time period, step 460. The non-priority vehicular repeater system begins by retransmitting the emergency alarm, or other short burst communication signal.

Figure 5:
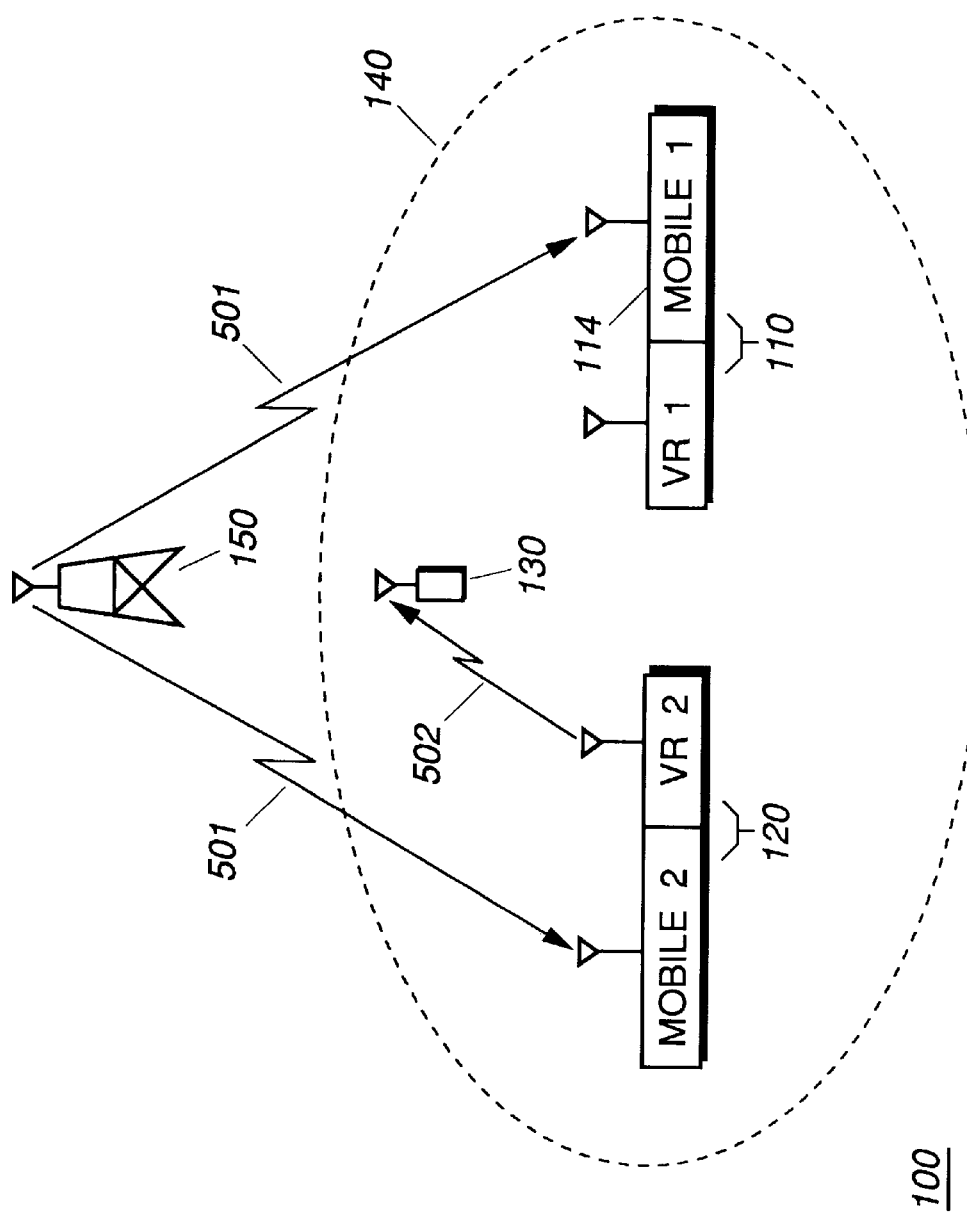
FIG. 5 shows the communication system of FIG. 1 with a modified signal path between a base station and a portable radio, in accordance with the present invention.

In another aspect of the present invention, the non-priority vehicular repeater system 120 assumes priority status when it is determined that the priority repeater is functioning in a reduced functionality mode. FIG. 5 depicts one such scenario. Here, the priority vehicular repeater system 110 is operating in a reduced functionality mode, such as when mobile radio 114 is operating in silent emergency mode. In silent emergency mode, signals 501 originating from the base station 150 and destined for the portable radio 130 are not retransmitted by the priority vehicular repeater system 110. The non-priority vehicular repeater system 120 detects the transmission of the signals 501 and determines that the priority vehicular repeater system is not available, or is operating in reduced functionality mode, which prevents retransmission of the signals 501. The non-priority vehicular repeater system 120 then operates as a priority repeater and repeats the communication signal 501 as a retransmitted signal 502 that can be received by the portable radio 130.

Figure 6:
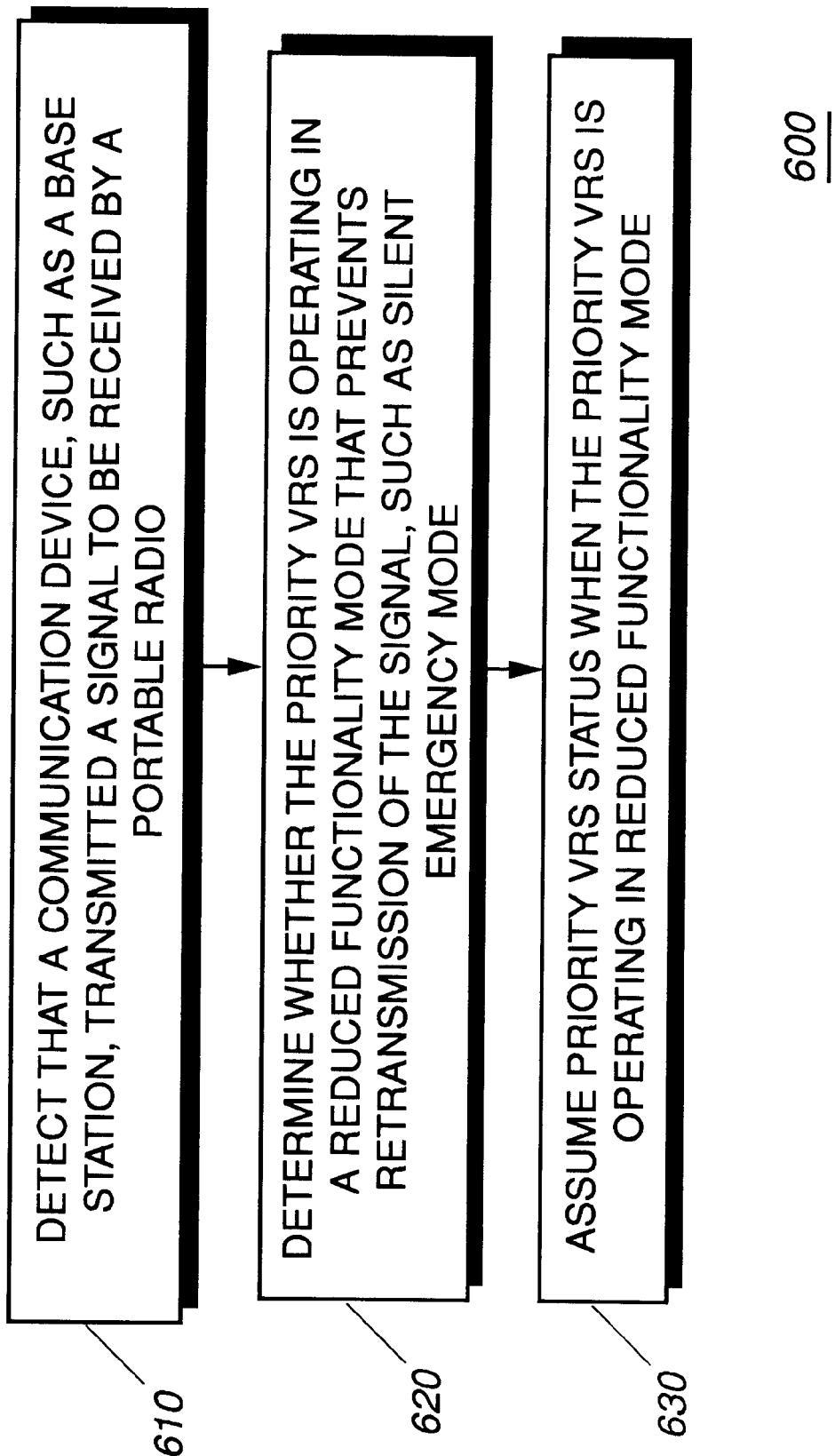
FIG. 6 is a flowchart of procedures for changing the priority status of a vehicular repeater system, in accordance with the present invention.

FIG. 6 is a flowchart of procedures 600 that summarize the operation of the non-priority vehicular repeater system in response to a priority vehicular repeater system that is unavailable, or operating in a reduced functionality mode. The non-priority vehicular repeater system detects that a communication device, such as a base station, has transmitted a signal to be received by a portable radio, step 610. The non-priority vehicular repeater system determines when the priority vehicular repeater system is operating in a reduced functionality mode that prevents retransmission of the signal, step 620, and upon such a determination, assumes priority vehicular repeater system status, step 630. The non-priority vehicular repeater determines that the priority vehicular repeater is operating in a reduced functionality mode when no acknowledgment to the signal is detected within a predetermined time period. In one embodiment, the non-priority vehicular repeater system determines when the priority vehicular repeater system has resumed operation in full functionality mode and relinquishes vehicular repeater system status in response.

The present invention provides significant benefits over the prior art. By including an acknowledgment to short burst communication signals, such as an emergency alarm signal, the automatic transmission priority scheme of the prior art is improved. A non-priority vehicular repeater system upon determining that an emergency alarm occurred without an acknowledgment can retransmit the emergency alarm, thereby providing more robust support for emergency operation. Moreover, by basing priority in part on content of communication signal rather than just on the existence of communication activity, a more robust priority scheme can be implemented. Furthermore, by assessing the operational mode of the priority repeater, repeater services may be temporarily assumed by a non-priority repeater, and relinquished when the original priority repeater has resumed full functional status thus avoiding a problem of multiple priority repeaters operating simultaneously.

What is claimed is:

1. A method for a vehicular repeater system, comprising the steps of:

operating a plurality of vehicular repeaters in a common communication environment according to a particular priority scheme that designates a priority vehicular repeater and a non-priority vehicular repeater from among the plurality of vehicular repeaters;

at the non-priority vehicular repeater:
   determining that an emergency alarm was submitted for retransmission by the priority vehicular repeater;
   monitoring for a particular time period to detect an alarm acknowledgment indicating that the emergency alarm was processed by the priority vehicular repeater, which alarm acknowledgment is distinct from a retransmission of the emergency alarm; and
   modifying the particular priority scheme when no alarm acknowledgment is detected by the non-priority vehicular repeater within the particular time period.

2. The method of claim 1, wherein the priority vehicular repeater and non-priority vehicular repeater each has a delay state that governs priority for repeating communication signals.

3. The method of claim 2, wherein the priority vehicular repeater has a delay state of zero and the non-priority vehicular repeater has a delay state with a non-zero value, and the step of modifying the particular priority scheme comprises the step of periodically reducing the non-zero value of the delay state of the non-priority vehicular repeater until the non-priority vehicular repeater has a delay state of zero and assumes priority repeater status.

4. The method of claim 3, wherein the alarm acknowledgment is communicated according a protocol that governs handshaking among vehicular repeaters.

5. The method of claim 1, further comprising the step of, at the non-priority vehicular repeater, retransmitting the emergency alarm when no alarm acknowledgment is detected within the particular time period.

6. The method of claim 1, further comprising the steps of:

at the non-priority vehicular repeater:
   determining whether the priority vehicular repeater is operating in a reduced functionality mode that prevents completion of at least one repeater function; and
   modifying the particular priority scheme to assume priority repeater status when the priority vehicular repeater is operating in the reduced functionality mode.

7. The method of claim 6, further comprising the step of, at the non-priority vehicular repeater, relinquishing priority repeater status when the priority vehicular repeater is no longer operating in the reduced functionality mode.

8. The method of claim 6, wherein the step of determining whether the priority vehicular repeater is operating in a reduced functionality mode, comprises the step of determining whether the priority vehicular repeater is in an emergency mode.

9. In a communication environment having a communication device and a plurality of vehicular repeaters within communication range thereof, including a first vehicular repeater having priority repeater status that signifies primary responsibility for repeating communications from the communication device, and a second vehicular repeater selectively adaptable to function with priority repeater status, a method comprising the steps of:

transmitting, by the communication device, a communication signal;
   at the second vehicular repeater:
   detecting transmission of the communication signal;
   monitoring to detect an acknowledgment generated by the first vehicular repeater, which acknowledgment is distinct from a retransmission of the communication signal; and
   assuming priority repeater status when the acknowledgment is not detected within a predetermined time period.

10. The method of claim 9, wherein the communication signal represents an emergency alarm.

11. The method of claim 9, wherein the first and second vehicular repeaters each has a delay state that governs priority for repeating communication signals.

12. The method of claim 11, wherein the first vehicular repeater has a delay state of zero and the second vehicular repeater has a delay state with a non-zero value, and the step of assuming priority repeater status comprises the step of periodically reducing the non-zero value of the delay state of the second vehicular repeater until the second vehicular repeater has a delay state of zero and assumes priority repeater status.

13. The method of claim 12, wherein the acknowledgment is communicated according a protocol that governs handshaking among vehicular repeaters.

14. The method of claim 9, further comprising the step of, at the second vehicular repeater, retransmitting the communication signal when no acknowledgment is detected within the predetermined time period.

15. A communication system, comprising:

a portable radio that selectively transmits radio signals, including an emergency alarm signal;

a first vehicular repeater system, comprising:
   a first vehicular repeater adaptable to receive radio signals transmitted by the portable radio;
   a first mobile radio, coupled to the first vehicular repeater, and adaptable to retransmit signals received by the first vehicular repeater;
   wherein the first vehicular repeater has priority repeater status that signifies primary responsibility for repeating the radio signals transmitted by the portable radio, and wherein the first vehicular repeater is adaptable to transmit an alarm acknowledgment when an emergency alarm signal is transmitted by the portable radio;
a second vehicular repeater system, comprising:
   a second vehicular repeater;
   a second mobile radio, coupled to the second vehicular repeater, and responsive to retransmit signals received by the second vehicular repeater; and
   wherein the second vehicular repeater system is adaptable to retransmit the emergency alarm signal and to assume priority repeater status when the portable radio transmits an emergency alarm signal and no alarm acknowledgment is transmitted by the first vehicular repeater.

16. The communication system of claim 15, wherein the second vehicular repeater system has a delay state that governs repeating of radio transmissions, and the delay state is reduced when no alarm acknowledgment is transmitted by the first vehicular repeater system in response to an emergency alarm transmitted by the portable radio.

17. The communication system of claim 16, wherein the first vehicular repeater system has a delay state of zero that indicates priority repeater status, and the second vehicular repeater system assumes priority repeater status by operating with a delay state of zero.

18. The communication system of claim 17, wherein the alarm acknowledgment comprises a tone signal.

19. In a communication environment having a communication device and a plurality of vehicular repeaters within communication range thereof, including a first vehicular repeater having priority repeater status that signifies primary responsibility for repeating communications from the communication device, and a second vehicular repeater selectively adaptable to function with priority repeater status, a method comprising the steps of:
   transmitting, by the communication device, a communication signal;
   at the second vehicular repeater:
      detecting transmission of the communication signal;
      determining whether the first vehicular repeater is operating in a reduced functionality mode that prevents retransmission of the communication signal; and
      assuming priority repeater status when the first vehicular repeater is operating in the reduced functionality mode wherein the step of determining comprises the step of monitoring to detect an acknowledgment generated by the first vehicular repeater in response to the communication signal, and determining that the first vehicular repeater is operating in a reduced functionality mode when no acknowledgment is detected within a predetermined time period.

20. The method of claim 19, wherein the step of determining comprises the step of determining whether the first vehicular repeater is operating in an emergency mode.

21. A method for a repeater system, comprising the steps of:
   operating a plurality of repeaters according to a particular priority scheme that designates a priority repeater and a non-priority repeater from among the plurality of repeaters;
   at the non-priority repeater:
      determining that an emergency alarm was submitted for retransmission by the priority repeater;
      monitoring for a particular time period to detect an alarm acknowledgment indicating that the emergency alarm was processed by the priority repeater, which alarm acknowledgment is distinct from a retransmission of the emergency alarm; and
   modifying the particular priority scheme when no alarm acknowledgment is detected by the non-priority repeater within the particular time period.

22. In a communication environment having a communication device and a plurality of repeaters within communication range thereof, including a first repeater having priority repeater status that signifies primary responsibility for repeating communications from the communication device, and a second repeater selectively adaptable to function with priority repeater status, a method responsive to a communication signal transmitted by the communication device, the method comprising the steps of:
   at the second repeater:
      detecting transmission of the communication signal;
      monitoring to detect an acknowledgment, distinct from a retransmission of the communication signal, which acknowledgment is generated by the first repeater; and
      assuming priority repeater status when the acknowledgment is not detected within a predetermined time period.

\* \* \* \* \*